United States Patent [19]

Liebel et al.

[11] Patent Number: 4,700,227

[45] Date of Patent: Oct. 13, 1987

[54] CIRCUIT FOR PRODUCING A VIDEO SIGNAL REPRESENTING A MEASURING SIGNAL

[75] Inventors: Werner Liebel; Peter Antesberger, both of Herrsching; Peter Einberger, Munich, all of Fed. Rep. of Germany

[73] Assignee: Glonner Electronic GmbH, Fed. Rep. of Germany

[21] Appl. No.: 855,179

[22] Filed: Apr. 23, 1986

[30] Foreign Application Priority Data

Apr. 29, 1985 [EP] European Pat. Off. ........ 85105223.3

[51] Int. Cl.[4] ........................ H04N 17/00; H04N 5/14

[52] U.S. Cl. .................................... 358/139; 358/166; 324/121 R

[58] Field of Search ................. 358/139, 166, 167, 93; 340/722, 753, 754; 324/121 R; 364/521

[56] References Cited

U.S. PATENT DOCUMENTS 3,686,662 8/1972 Blixt et al. ...................... 340/324 A
3,875,328 4/1975 Gibson et al. ...................... 358/139
4,068,310 1/1978 Friauf ................................ 354/521
4,225,940 9/1980 Moriyasu et al. ............... 324/121 R
4,268,851 5/1981 Heller et al. ........................ 358/139
4,326,219 4/1982 Griesshaber ........................ 358/139

*Primary Examiner*—Howard W. Britton
*Assistant Examiner*—John K. Peng
*Attorney, Agent, or Firm*—Hubbard, Thurman, Turner & Tucker

[57] ABSTRACT

A circuit for producing a video signal representing a measuring signal is already known, said circuit comprising a video storage circuit, a horizontal address control circuit for controlling said video storage circuit, a circuit for producing a vertical signal and a comparator circuit which, when the vertical signal essentially corresponds to a signal derived from the video storage circuit, produces a comparison signal representative of a point of the measuring signal in the instantaneously produced line of the video signal. For the purpose of improving the measuring signal representation quality, the invention provides the feature that a video D/A converter and a low-pass filter circuit are inserted between the video storage circuit and the comparator circuit.

13 Claims, 3 Drawing Figures

CIRCUIT FOR PRODUCING A VIDEO SIGNAL REPRESENTING A MEASURING SIGNAL

The present invention refers to a circuit for producing a video signal representing a measuring signal in accordance with the generic clause of claim 1.

A circuit for producing video signals which can also be used for representing measuring signals is already known. The known circuit is provided with a video storage circuit constructed as a RAM. The video storage circuit has connected thereto a horizontal address control circuit which sequentially addresses synchronously with the horizontal synchronization signal a number of storage cells of the video storage circuit, each of said storage cells having stored therein digital values of the measuring signal. It follows that the known horizontal address control circuit effects full readout of the memory content of the video storage circuit in response to passage of each line of the instantaneously produced video signal. Hence, a representation of the stored measuring signal appears in synchronism with the horizontal synchronization signal at the output of the video storage circuit in response to passage of each line of the video signal. A vertical control circuit produces a vertical signal representative of the instantaneous vertical position, i.e. of the height of the respective image line written. Furthermore, the known circuit for producing a video signal representing a measuring signal includes a comparator circuit which follows the video storage circuit and which, too, has supplied thereto the output signal of the vertical control circuit. The comparator circuit produces a signal whenever the vertical signal corresponds to the output signal of the video storage circuit of the D/A converter. In other words, the comparator signal produced by the comparator circuit indicates that the measuring signal curve applied to the output of the video storage circuit has a value corresponding to the height indicated by the vertical signal. It follows that the comparator signal indicates the intersecting point of the measuring signal and of the vertical signal. This signal is used for controlling a video signal modulator controlling the voltage of the video signal in response to the comparison signal between the black level and the while level. The output signal of the video signal modulator has added thereto the horizontal synchronization signal and the vertical synchronization signal and the resultant video signal is supplied to a video reproducer. The measuring signal appearing on the screen shows, primarily in the area of steep signal edges, stepped or jagged distortions, i.e. it has a signal profile which deviates from the original measuring signal profile in a disturbing manner.

In comparison with this prior art, the present invention is based on the task of further developing a circuit according to the generic clause of claim 11 in such a way that an improved representation of a measuring signal can be obtained by means of said circuit.

In the case of a circuit provided with the features according to the generic clause of claim 1, this task is solved by the feature according to the characterizing clause of claim 1.

The low-pass filter circuit following the video D/A converter is used for mitigating quantization steps in the case of the measuring signal applied to the output of the video D/A converter whenever a video image line is produced, which quantization steps resulted from an association of individual measuring signal points with the raster prior to its digitalization. A comparison of the thus filtered signal with the vertical signal of the vertical control means is no longer carried out such that—as is the case with the prior art—a presence of the measuring signal within the raster of the screen point subdivision is determined, i.e. such that the measuring signal is associated e.g. with a specific left-hand or with a specific right-hand screen point, which is the respective point approaching the optimum measuring signal representation most closely, but, contrary to this type of association, a comparison signal is now produced also at arbitrary locations between two image points within a line. The improvement in video measuring signal representation achieved by means of the circuit according to the invention is shown in a particularly clear manner on the basis of the following example:

Let us assume that a measuring signal has to be represented, which includes an almost perpendicular signal edge, said edge having e.g. a slope of 10 screen lines in the vertical direction and a horizontal extension of only two screen points. The only possibility of representing such a steep signal edge by means of the known circuit was that the signal appeared as a stair including two vertical lines, which each had a length of five lines, and a horizontal displacement of one screen point. The circuit according to the invention, however, makes appear a screen representation in the case of which the successive measuring signal points of successive screen lines only show a displacement of one tenth of a screen point in the case of this example. A representation of this type is seen as a stepless, slightly inclined line.

It follows that, in the case of continuous, steady signals, the circuit according to the invention provides the possibility of achieving a clearly improved quality of the screen representation of the measuring signal.

A further increase in the quality of screen representation of measuring signals is achieved due to the fact that the comparison signal produced by the comparison circuit assumes a maximum value when the vertical signal corresponds to the output signal of the video D/A converter, and that the comparision signal continuously decreases as the difference between the vertical signal and the output signal increases, said comparison signal assuming—in cases in which said difference exceeds a limit value—the value indicative of the nonexistence of the point of the measuring signal in the instantaneously produced line of the video signal. The last-mentioned value is the white level of the video signal in the case of a black representation of the measuring signal on a white background, and the black level of the video signal in the case of a white representation of the measuring signal on a black background. By means of this embodiment of the comparison circuit it is achieved that the closer the measuring signal value, which is compared with the vertical signal, approaches the vertical signal value, the brighter the measuring signal represented will be. It follows that maximum brightness will be obtained when the output signal of the low-pass filter corresponds to the vertical signal, whereas e.g. an approximately semi-brightness of the image point will be produced in cases in which the video signal lies between two values of the vertical signal which are indicative of two neighbouring lines. This brightness control of the video signal has the effect that even in the case of an approximately horizontal measuring signal a representation is obtained which, from the optical point of view, seems to have no steps.

The limit frequency of the low-pass filter circuit preferably lies between one third and one tenth of the line frequency multiplied by the number of image points per line, since in this case an improvement in the shape of the represented measuring signal is effected practically without any limitation of the measuring signal frequency range which can be represented. In other words, a representation of measuring signals whose represented period is shorter than e.g. three image points can be dispensed with, since such signals can no longer be represented as vibration in view of the raster which will then be too coarse.

In the case of the normal line frequency of 15 625 Hz and the normal number of 833 image points per line, the limit frequency of the low-pass filter circuit is preferably chosen such that it lies in the range between 1 and 10 MHz.

Interference effects which may occur when new digital values are taken over into the converter are avoided by the use of a holding circuit at the input of the video D/A converter circuit. This interference known as "clitch" effect can be avoided by means of commercially available D/A converters, which are, in most cases, already provided with integrated holding circuits.

A better detectability of short-term events, such as short pulses, is achieved due to the fact that the output side of the comparator circuit has connected thereto a comparison signal broadening circuit whose output signal rapidly follows a rise of the comparison signal and whose output signal follows a fall of the comparison signal only in accordance with a predetermined time constant. Such a detection of short-term events can be helpful in particular in the field of medicine for the purpose of indicating signals which have been derived from a patient by means of measuring transducers.

A processing of the measuring signal which is independent of the processing of the video signal with regard to the clock pulses of said video signal processing is achieved due to the fact that an intermediate storage circuit for measuring signal data formed on the basis of measuring signal is connected to a data input of the video storage circuit and due to the fact that, after each production of a video signal representing a half-picture, the memory content of the intermediate storage circuit can be stored in the video storage means. This structure permits a management of measuring signal data which, with regard to clock pulses, can largely be decoupled from the video clock pulses.

A synchronization of the periodic read-out of the video signal storage means with the video clock pulses is achieved on the basis of the fact that the horizontal address control circuit is provided with a pixel clock generator which produces, in synchronism with the horizontal synchronization signal, a pulse signal whose line frequency is multiplied by the number of image points per line, said horizontal address control circuit being provided with a first counter which produces the instantaneous address of a storage cell of the video storage circuit to be read out and which is connected to said pixel clock generator, the count of said counter being adapted to be varied in response to the pulse signal of the pixel clock generator, whenever a line is produced, beginning from a starting address onwards. The starting address of the first counter remains constant for at least one respective half-picture.

The measuring signal is preferably represented in a representation moving in a quasi continuous manner towards the left edge of the screen. For this purpose, the intermediate storage circuit is provided with a microcomputer by means of which the instantaneous starting address of the first counter is changed - in each case prior to the production of a video signal representing a half-picture—by a predetermined starting address difference relative to the starting address of the first counter in the case of the production of the preceding half-picture.

Software adjustability of the respectively represented screen line length is provided by means of the second counter of the horizontal address control circuit, also said second counter being connected to the pixel clock generator and producing an overflow signal after having counted, beginning with a second starting address, a number of pulses of the pixel clock generator corresponding to the number of image points of an image line of a desired length. This overflow signal effects, preferably in synchronism with the pulses of the pixel clock generator, resetting of a logic circuit, said logic circuit being set—again preferably in synchronism with the pulses of the pixel clock generator—when the horizontal synchronization signal occurs. The logic circuit controls loading of the first and second counters with the first and second starting addresses of the counters while it is in its reset condition.

A vertical signal of particularly high accuracy in relation to the number of lines is provided by the circuit for producing a vertical signal if said circuit is provided with a third counter, which counts the pulses of the horizontal synchronization signal and which is reset by the vertical synchronization signal, said third counter controlling a programmable read-only memory whose output is connected to the vertical D/A converter. This embodiment of the circuit for producing the vertical signal does not only offer the advantage of high accuracy of the vertical signal with regard to time as well as with regard to amplitude, but it also provides the possibility of easy adaptation of the time variation of the vertical signal by means of suitable programming of the read-only memory.

The read-only memory is preferably programmed such that, in the case of rising counts of the third counter, the circuit for producing the vertical signal outputs a sawtooth-shaped vertical signal having a number of sawtooth-shaped ramps corresponding to the number of simultaneously representable measuring signals. In other words, the situation is in this case such that each measuring signal to be represented has associated therewith a specific line area of the screen to which a count range of the third counter corresponds. Upon running through each count range, the output signal of the programmable read-only memory and, consequently, also the output signal of the vertical D/A converter following said read-only memory runs through a quasi-continuous ramp. In the case of such a vertical signal control, a plurality of measuring signals can be represented.

If the number of measuring signals to be represented increases to such an extent that the line area associated with an individual measuring signal excessively limits the measuring signal amplitude, a partly or fully overlapping representation of the individual measuring signal curves on common line areas of the screen is possible due to the fact that there are provided two different, independent circuits, which each include the circuit for producing a vertical signal, the video storage circuit, the video D/A converter, the low-pass filter circuit and the comparator circuit.

In the following, preferred embodiments of the present invention will be explained in detail while making reference to the drawings enclosed, in which.

Figure 1:
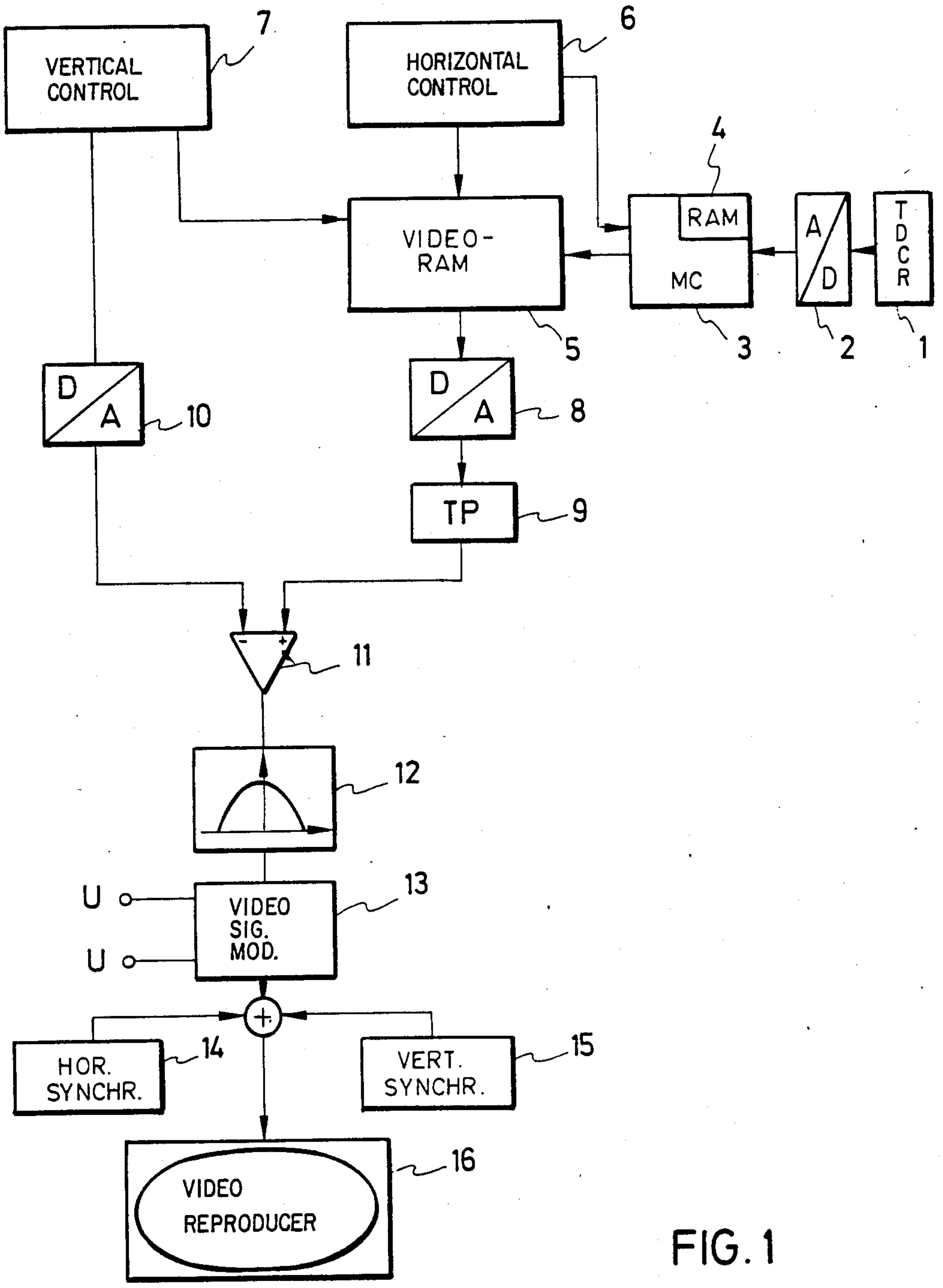
FIG. 1 shows a block diagram of the circuit according to the invention.

First of all, reference is made of FIG. 1. A measuring transducer 1 produces a measuring signal, which is supplied to an analogue-digital converter 2 (A/D converter 2). The digital representation of the measuring signal is applied to a data input bus of a microcomputer 3. The microcomputer 3 periodically scans the digitized measuring signal and stores the measuring signal values in a random-access memory (RAM) 4. A data output bus of the microcomputer 3 is connected to a data input of a video RAM 5. The microcomputer 3 as well as the video RAM 5 are connected to a horizontal control or horizontal address control circuit 6 controlling the time sequence of operation of the microcomputer 3 and of the video RAM 5. The data output signal of the video RAM 5 is supplied to a digital-analogue converter (D/A converter) 8 which is provided with a holding circuit. The D/A converter 8 has its output side connected to the input of a low-pass filter circuit 9 whose output signal is supplied to a first input of a differential amplifier 11. A vertical control means 7 is connected to the video RAM 5 for controlling a desired storage area associated with one measuring signal channel of a plurality of measuring signal channels. The vertical control means 7, which will also be referred to hereinbelow as circuit for producing a vertical signal 17, is also connected to a digital-analogue converter (D/A converter) 10, said D/A converter having its output side connected to a second input of the differential amplifier 11. The differential amplifier 11 is connected to an intensity control circuit 12. The intensity control circuit is a circuit which has the transfer characteristic outlined in FIG. 1, i.e. which produces a maximum output signal in the case of a zero value of the input signal, said output signal decreasing continuously as the absolute value of the input signal increases, and, above a positive or negative limit value for the input signal, it assumes the value zero on the output side.

The output signal of the intensity control circuit is used for controlling a video signal modulator 13 following said intensity control circuit and having supplied thereto a black level $U_{black}$ and a white level $U_{white}$. The resultant output signal of the video signal modulator 13 is combined with a horizontal synchronization signal coming from a horizontal synchronization circuit 14 and with a vertical synchronization signal coming from a vertical synchronization signal circuit 15. The signal obtained at the summation point is a complete video signal which serves to control a video reproducer 16 following said summation point.

Figure 2:
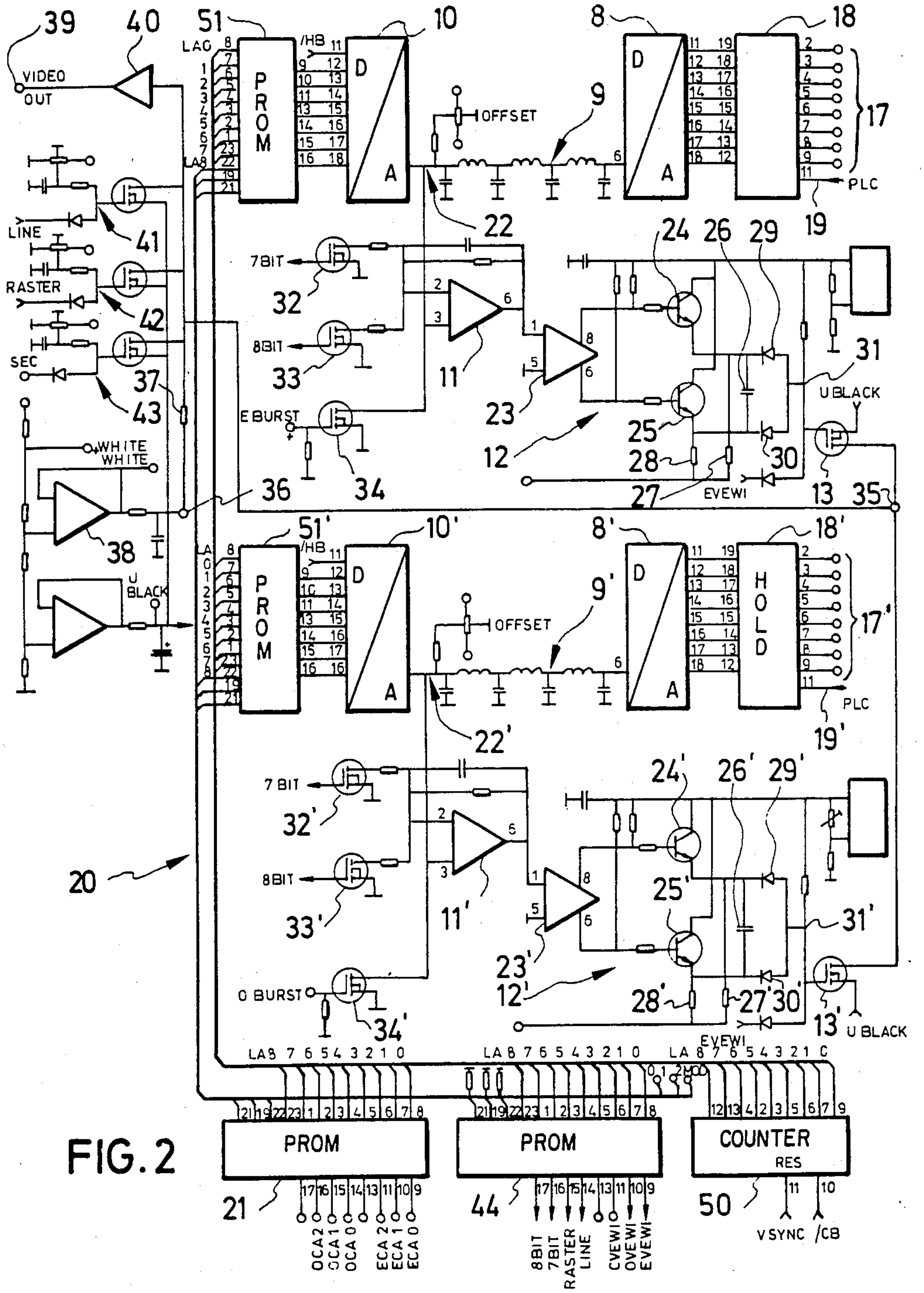
FIG. 2 shows a detailed circuit diagram of the circuit according to FIG. 1.

Details of the circuit shown in FIG. 1 are now explained while making reference to FIG. 2. Reference numerals in FIG. 2, which correspond to those according to FIG. 1, refer to identical or similar parts.

Reference numeral 17 and reference numeral 17' refer to two parallel data output buses of the video RAM 5, which is not shown in FIG. 2, said video RAM 5 being constructed as dual port video RAM 5 in the case of the preferred embodiment shown in FIG. 2. Each data output bus of the dual port video RAM 5 is connected to circuits, which are constructed in a fully identical manner and which will be described in detail hereinbelow. It can be seen from FIG. 2 that the upper right part of the circuit and the central right part of the circuit have a fully identical structural design. Hence, it will be sufficient to describe only the upper right part of the circuit, said description applying in an analogous manner also to the central right part of the circuit whose elements are provided with the same reference numerals which are, however, marked with an apostrophe.

Figure 3:
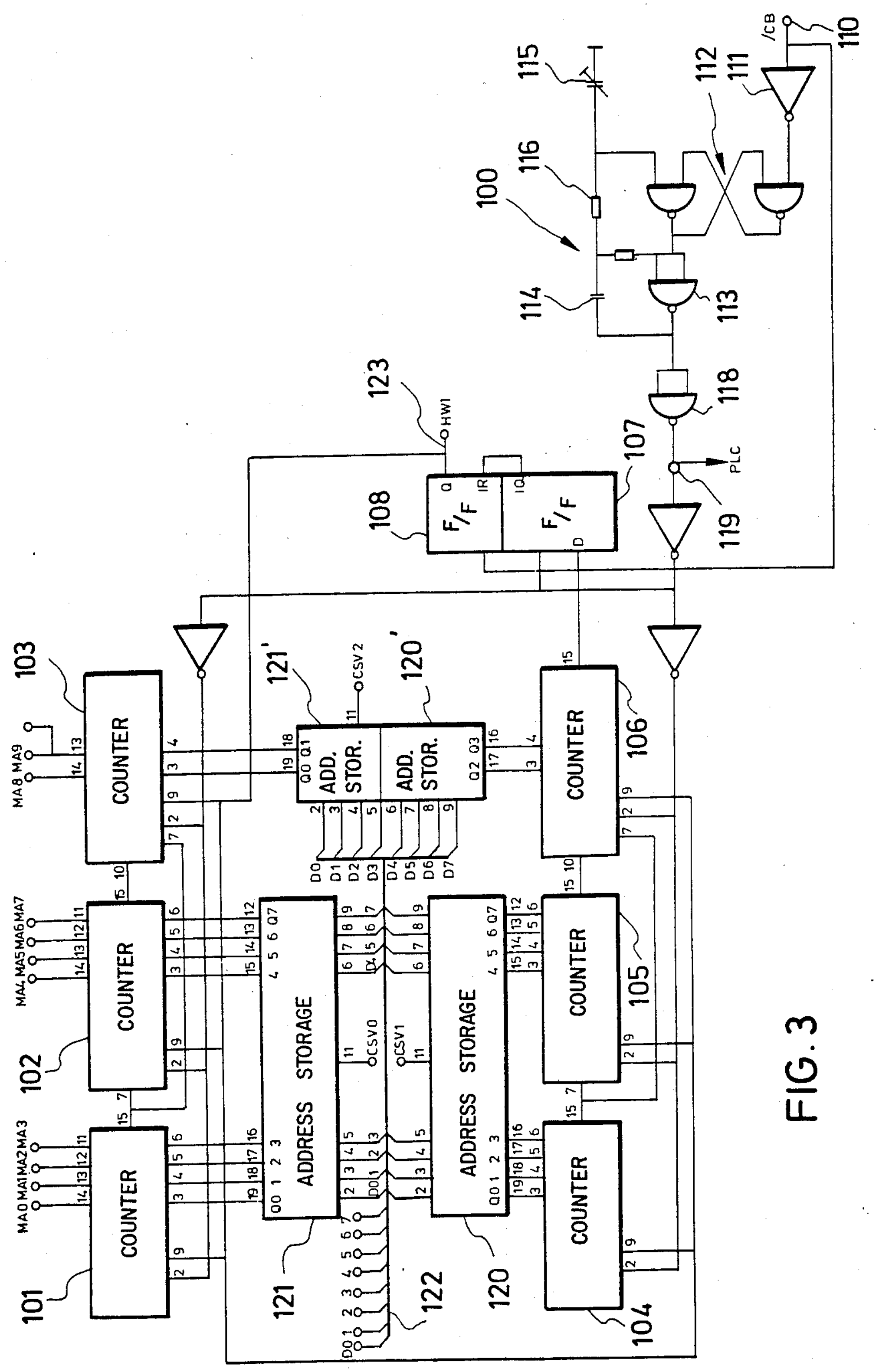
FIG. 3 shows a circuit diagram of the horizontal control or horizontal address control circuit which is provided for controlling the circuit according to FIG. 1.

The data output bus 17 is connected to a holding circuit 18 which is provided with a clock-pulse input 19 connected to a pixel clock generator 100 which produces the pixel clock signal PLC and which will be described in detail hereinbelow while making reference to FIG. 3. The holding circuit 18 has connected thereto a digitalanalogue converter 8 producing at its output 6 an impressed current which corresponds to the data work applied to the input side. The output 6 of the D/A converter 8 is connected to the filter circuit 9, which, as a whole, is provided with reference number 9 and which attenuates the harmonics of the output current of the D/A converter. The D/A converter 8 has a predetermined internal resistance which closes the filter circuit at its output 6. A third counter 50 is provided with an input 10 having applied thereto the horizontal synchronization signal and with a reset input 11 having applied thereto the vertical synchronization signal. The third counter 50 is used for determining the number of horizontal synchronization pulses which have occurred since the last vertical synchronization pulse. In other words, the count of the third counter 50 corresponds to the number of the line of the screen of the video reproducer 16 which is written on by an instantaneously produced video signal. The third counter 50 is connected to a read-only memory circuit 51 via an address bus 20, said read-only memory circuit 51 being referred to as vertical PROM 51 in the following.

The vertical PROM is programmed such that, in the case of continuously increasing input addresses, it produces a data output word corresponding to a sawtooth curve with a plurality of quasi-continuous ramps. One respective ramp of the output signal of the vertical PROM 51 is used for producing a comparison signal for one respective measuring signal among a plurality of measuring signals deposited in the respective channel (in this case in the upper channel) of the dual port video RAM 5.

As has already been explained with regard to the vertical control means 7 in connection with FIG. 1, said vertical control means 7 is connected to the video RAM 5. The connection between the vertical control means 7 and the video RAM 5 is used for the purpose of addressing the respective measuring signal channel to be read out. In the case of the embodiment shown in FIG. 2, the vertical addressing of the video RAM is effected by means of the channel addressing PROM 21, which, too, has its input side connected to the address bus 20.

The output side of the vertical PROM 51 is connected to the vertical D/A converter 10, which has the same structure as the video D/A converter 8. Also the vertical D/A converter 10 has an analogue output having an impressed current source and a predetermined internal resistance closing the low-pass filter circuit 9 towards the analogue current output side of the vertical D/A converter 10.

It follows that the video D/A converter 8 with its impressed output current operates via the low-pass filter circuit 9 against the internal resistance of the vertical D/A converter 10, and said vertical D/A converter 10 with its impressed output current operates via the low-pass filter circuit 9 against the internal resistance of the video D/A converter 8. Hence, the junction, which is provided with reference numeral 22, has applied thereto a differential voltage signal resulting from the current output signal of the low-pass filter circuit 9 against the internal resistance of the converter 10 and from the output current of the converter 10 against the internal resistance of the converter 8.

The voltage of the differential signal is amplified via a differential amplifier circuit 11 and is applied to the input of an amplifier 23. Depending on the polarity of the input signal, the amplfier 23 produces at one of its two outputs 6, 8 an output signal for controlling amplifying transistors 24, 25 follwing said amplifier 23. The transistors 24, 25 have their collector side connected to a positive supply voltage, whereas the emitter side is connected to one respective electrode of a capacitor 26. Each capacitor electrode is connected to a negative potential via a discharge resistor 27, 28. The charge on the more negative electrode of the capacitor 26 determines the potential of an output junction 31 via diodes 29, 30 connected to the electrodes of the capacitor 26 as well as to said output junction 31.

The capacitor-resistor circuit 26 to 30 defines together with the transistors 24, 25 a circuit which is capable of rapidly following a fast rise of the input signal of the amplifier 23 on the input side, the absolute value of the output signal decreasing—when the input signal has ceased to exist—only with an RC time constant which is determined by the value of the capacitor 26 and of the resistor 27, 28.

It follows that this circuit effects a desirable broadening of short input signal pulses for the purpose of making said pulses visible on a screen image.

The amplification factor and the transfer characteristic of the whole intensity control circuit 12 can be influenced by appropriate switching of the field-effect transistors 32 to 34.

The transfer characteristic of the whole circuit between the junction 22 and the output junction 31 is of such a nature that a zero level input signal at the junction 22 results in a maximum absolute value of the output signal, an increasing absolute value of the input voltage at junction 22 producing the effect that the absolute value of the output signal decreases. If the differential voltage at point 22 exceeds a predetermined limit value, the absolute value of the output signal will be zero. This transfer characteristic is roughly outlined adjacent reference numeral 12 in FIG. 1.

The potential at the output junction 31 controls a fieldeffect transistor 13 which has its gate side connected to said output junction and which is used as a video signal modulator 13.

Depending on whether the upper or the lower channel 17, 17′ of the video RAM 5 is activated at the time in question, either the upper field-effect transistor 13, which acts as a video signal modulator, or the corresponding lower field-effect transistor 13′ is controlled. These field-effect transistors 13, 13′ are connected to a common junction as well as to a black potential. The common junction 35 is connected to an output 36 of a white potential generating circuit 38 via a resistor 37.

If the output junction of the two intensity control circuits 12, 12′ does not have applied thereto any signal, whereby it is indicated that the instantaneous measuring signal is far away from the instantaneous vertical signal, the field-effect transistors 13, 13′ are blocked so that a video signal output 39, which is arranged subsequent to an isolating amplifier 40, has essentially applied thereto the white potential of the junction 36. If, however, one of the two field-effect transistors 13, 13′ is activated, since the input signal of the circuits 11, 12 at the junction 22 is zero, i.e. indicates corresponding between the vertical signal and the instantaneous measuring signal, the junction 35 is at the black level, which means that also the video output 39 has applied thereto a signal with black level.

The signal with black level applied to the output 39 corresponds to a point of the measuring signal appearing in black within the instantaneously written line of the video signal.

The circuits which are, as a whole, provided with reference numerals 41 to 43 are used for selective additional production of a line, of a raster or of a clock pulse. These additional circuits 41 to 43 are controlled by an additional PROM 44, which, too, is connected to the address bus 20.

FIG. 2 shows the whole circuit which follows the video RAM 5 and which is used for producing a video signal representing a measuring signal, but said FIG. 2 does not show the address control circuit of the video RAM 5 which is not shown either.

In order to explain the horizontal address control circuit 6 for the video RAM 5 reference will be made to FIG. 3 hereinbelow. In FIG. 3, reference numeral 100 refers to a pixel clock generator as a whole. The pixel clock generator 100 is provided with a horizontal synchronization input 110 having supplied thereto the horizontal synchronization signal. This input has connected thereto a flip-flop 112 via a negating gate circuit 111, the ouput of said flip-flop having connected thereto an additional negating gate 113 and a time constant circuit 114 to 117. The time constant circuit comprises two capacitors 114, 115 and two resistors 116, 117. The pixel clock signal is taken from the output of this network, which is negated once more by means of the gate 118, at the junction 119. At the first counter, which comprises the counter components 102 to 103, this pixel clock signal is supplied to a second counter, which comprises the counter components 104 to 106, as well as to a D-flip-flop 107. The first counter 101 to 103 supplies at its outputs MA 0 to MA 9 the address signals for the video RAM 5. The second counter 104 to 106 serves to produce an overflow signal, which is supplied to the D input of the flip-flop 107 as soon as the number of pixel clock pulses determined by said counter corresponds to a desired length of a video line. Both counters 101 to 103; 104 to 106 are connected to starting address storage circuits 120, 121, which are also formed by appropriate parts of the storage element 120′, 121′. The starting address storage circuit 120, 121 are connected to the microcomputer 3 (cf. FIG. 1) via a starting address bus 122, said microcomputer 3 loading said starting address storage circuits with starting addresses for the first and for the second counter while effecting appropriate control of their inputs CSV 0, CSV 1.

The starting address storage circuit 120 is loaded with a value having with regard to the overflow value of the second counter 104 to 106 a difference of such a nature that said difference determines the number of pixel clock pulses forming a line with a desired length. The starting address for the first counter 101 to 103, which is deposited in the first starting address storage means 121, represents the start address for reading the video RAM 5 in the case of a specific half picture. When this starting address is incremented, the start address at which reading of the video RAM 5 begins will be incremented as well so that the measuring signal on the screen is displaced with every half picture. It follows that incrementing of the first starting address will produce on the screen a measuring signal which is moving in a desirable manner.

In the case of overflow of the second counter, which indicates that the line length has been reached, and in the case of simultaneous occurrence of a pixel clock pulse supplied to the clock pulse input of the first flip-flop 107, said first flip-flop is set. The negated output of said flip flop is connected to the reset input of the second flip-flop 108, said second flip-flop being thus set to "low". This condition of the second flip-flop 108 continues to exist until the clock pulse input of said second flip-flop has supplied thereto from input 110 a line synchronization signal or a horizontal synchronization signal.

The signal appearing at the output 123 of the flip-flop 108 can be referred to as horizontal window, which is opened at the beginning of each line and which is closed in the case of overflow of the second counter, i.e. at the end of the line. During the reset condition of the second flip-flop 108 load inputs 9 are activated, said load inputs 9 being connected to the second flip-flop 108 at the output 123 thereof. This has the effect that, in the reset condition of the second flip-flop 108, the contents of the starting address storage means 120, 121 are transferred into the first and second counters 101 to 103, 104 to 106.

The circuit according to the invention cannot only be used for improving the image representation quality for a measuring signal in the case of a video system having the basic structure which is shown in FIG. 1, but it is also possible to use the circuit according to the invention in a system in the case of which a measuring signal is in some way temporarily stored, e.g. in a pulse-code-modulated form, on a storage medium, such as a magnetic tape storage means, and is, if required, transferred to the video storage circuit, which, in turn, is followed by a circuit having esentially the structure of the circuit which is part of the embodiment according to FIG. 1 and which follows the video RAM.

The measuring signal may, for example, be recorded in a pulse-code-modulated form on a video tape by means of a video recorder and, upon reproduction, it may be converted into a binary digital signal which is applied to the data input bus of the microcomputer 3.

The low-pass circuit following the video D/A converter need not have the configuration shown in FIG. 1, but it may be provided simply on the basis of the fact that the output of the D/A converter itself has a frequency-limiting effect. It follows that the low-pass structure according to the invention may be realized by any means resulting in a limit frequency whose order of magnitude ranges from the pixel clock pulse frequency down to one tenth of the pixel clock pulse frequency.

If the only signals represented are signals having a long period in comparison with the length of the line, it will also be possible to reduce the limit frequency of the low-pass filter circuit down to the order of magnitude of the line frequency.

In accordance with a modification of the embodiment shown in FIG. 1, the comparison circuit 11, 12 may also be provided in the form of a digital window comparator.

Instead of the modulation of a black-white measuring signal which has been described with reference to FIG. 1, it is also possible to form a coloured measuring signal on a background having a different colour in the case of a colour video system.

The system according to the invention is preferably used in the field of medical electronics. The system can, however, be used whenever signals with a substantially continuous profile are to be represented on a video reproducer or are to be stored in the form of a video signal.

We claim:

1. A circuit (1–16) for producing a video signal representing a measuring signal, comprising:

a video storage circuit (5);

a horizontal address control circuit (6) for effecting, at a frequency depending on a line frequency of the video signal to be produced, readout of a memory content of the video storage circuit (5), said memory content being associated with the horizontal address;

a circuit (7) for producing a vertical signal representing the instantaneous vertical position of the video signal to be produced;

a comparator circuit (11, 12) which, when the vertical signal essentially corresponds to a signal derived from the video storage circuit (5), produces a comparison signal representative of a point of the measuring signal in the instantaneously produced line of the video signal, characterized in that a video D/A converter (8) and a low-pass filter circuit (9) connected to an output of said video D/A converter (8) are inserted between the video storage circuit (5) and the comparator circuit (11, 12).

2. A circuit according to claim 1, characterized in that:

the comparison signal produced by the comparison circuit (11, 12) has a maximum value when the vertical signal corresponds to the output signal of the low-pass filter circuit (9);

that said comparison signal continuously decreases as the difference between the vertical signal and the output signal increases; and that when said difference exceeds a limit value, said comparison signal will assume the value indicative of the non-existence of the point of the measuring signal in the instantaneously produced line of the video signal.

3. A circuit according to claim 1 characterized in that:

a limit frequency of the low-pass filter circuit (9) lies between one-third and one tenth of the line frequency multiplied by the number of image points per line.

4. A circuit according to claim 1, characterized in that:

the limit frequency of the low-pass filter circuit (9) lies between 1 and 10 Mhz.

5. A circuit according to claim 1 characterized in that:

the video D/A converter (8) is provided with a holding circuit which is connected to an input thereof.

6. A circuit according to claim 1 characterized in that:

the output side of the comparator circuit (11, 12) has connected thereto a comparison signal broadening circuit whose output signal rapidly follows a rise of the comparison signal and whose output signal follows a fall of the comparison signal in accordance with a predetermined time constant.

7. A circuit according to claim 1 characterized in that:

an intermediate storage circuit (3, 4) for measuring signal data formed on the basis of the measuring signal is connected to a data input of the video storage circut (5); and that the memory content of the intermediate storage circuit (3, 4) can be stored in the video storage means (5) after each production of a video signal representing a half picture.

8. A circuit according to claim 2 characterized in that:

the horizontal address control circuit (6) is provided with a pixel clock generator (100) which produces, in synchronism with the horizontal synchronization signal, a pulse signal whose line frequency is multiplied by the number of image points per line, and;

that said horizontal address control circuit (6) is provided with a first counter (101–103) which produces the instantaneous address of a storage cell of the video storage circuit (5) to be read out and which is connected to the pixel clock generator (100), the count of said counter being adapted to be varied in response to the pulse signal of the pixel clock generator (100), whenever a line is produced, beginning from a starting address onwards, said starting address being invariable for one respective half picture.

9. A circuit according to claim 8 characterized in that:

an intermediate storage circuit (3, 4) for measuring signal data formed on the basis of the measuring signal is connected to a data input of the video storage circuit (5), and that the memory content of the intermediate storage circuit (3, 4) can be stored in the video storage means (5) after each production of a video signal representing a half picture said intermediate storage circuit (3, 4) comprising a microcomputer (3) by means of which the instantaneous starting address of the first counter (101–103) is changed prior to the production of a video signal representing a half-picture, by a predetermined starting address difference relative to the starting address of the first counter (101–103) for the production of the video signal representing the preceding half-picture.

10. A circuit according to claim 8 characterized in that the horizontal address control circuit (6) is provided with a second counter (104–106), which is connected to the pixel clock generator (100) and which is adapted to produce an overflow signal after having counted, beginning with a second starting address, a number of pulses of the pixel clock generator (100) corresponding to the number of image points of an image line of a desired length;

that the horizontal control circuit (6) is provided with a logic circuit (107, 108), which is adapted to be set by the horizontal synchronization signal and which is adapted to be reset by the overflow signal of the second counter, said logic circuit being connected to said first and second counters (101–103; 104–106); and that said first and second counters (101–103; 104–106) are adapted to be loaded with the starting addresses while said logic circuit (107, 108) is in its reset condition.

11. A circuit according to claim 8 characterized in that:

the circuit (7, 10) for producing the vertical signal is provided with a third counter (50), which counts the pulses of the horizontal synchronization signal and which is reset by the vertical synchronization signal; and that the circuit (7, 10) for producing the vertical signal is additionally provided with a programmable read-only memory (51, 51'), which is connected to the third counter (50) and which is connected to a vertical D/A converter (10, 10') producing the vertical signal.

12. A circuit according to claim 11 characterized in that:

the circuit (7, 10) for producing the vertical signal produces a sawtooth-shaped vertical signal in the case of rising counts of the third counter (50), said sawtooth-shaped vertical signal having a number of sawtooth-shaped ramps corresponding to the number of simultaneously reproduceable measuring signals.

13. A circuit according to claim 1 characterized by:

two circuits which each comprise the circuit (7, 10) for producing a vertical signal, the video storage circuit (5), the video D/A converter (8), the low-pass filter circuit (9) and the comparator circuit (11, 12).

* * * * *

UNITED STATES PATENT AND TRADEMARK OFFICE

CERTIFICATE OF CORRECTION

PATENT NO. : 4,700,227

DATED : October 13, 1987

INVENTOR(S) : Werner Liebel, Peter Antesberger, & Peter Einberger

It is certified that error appears in the above-identified patent and that said Letters Patent is hereby corrected as shown below:

Col. 1, line 56 [pg. 2, ln. 24], "Claim 11" should be --Claim 1--.

Col. 5, line 38 [pg. 10, ln. 2], "signal 17" should be --signal 7--.

Col. 6, line 23 [pg. 11, ln. 22], "work" should be --word--.

Col. 8, line 3 [pg. 15, ln. 1], "If the output junction of the two intensity control circuits" should be --If the output junction 31 of the two intensity control circuits--.

Col. 8, line 13 [pg. 15, ln.12], "corresponding" should be --correspondence--.

Col. 8, line 48 [pg. 16, ln. 13], "102" should be --101--.

Col. 8, line 61 [pg. 16, ln. 26], "circuit" should be --circuits--.

Signed and Sealed this

Twenty-second Day of March, 1988

*Attest:*

DONALD J. QUIGG

*Attesting Officer* *Commissioner of Patents and Trademarks*